United States Patent
Duvvuri et al.

(10) Patent No.: US 9,915,939 B2
(45) Date of Patent: Mar. 13, 2018

(54) SYSTEMS AND METHODS FOR PROVIDING MULTIPLE FRAME RATES ON A COMMON PHYSICAL NETWORK

(71) Applicant: General Electric Company, Schenectady, NY (US)

(72) Inventors: Muralidhar Venkata Subrahmanya Duvvuri, Hyderabad (IN); Harry Paul Ridenour, III, Salem, VA (US)

(73) Assignee: General Electric Company, Schenectady, NY (US)

( * ) Notice: Subject to any disclaimer, the term of this patent is extended or adjusted under 35 U.S.C. 154(b) by 868 days.

(21) Appl. No.: 14/106,176

(22) Filed: Dec. 13, 2013

(65) Prior Publication Data
US 2015/0168946 A1    Jun. 18, 2015

(51) Int. Cl.
 G06F 3/00      (2006.01)
 G05B 19/418    (2006.01)
 G05B 19/042    (2006.01)
 H04L 29/08     (2006.01)

(52) U.S. Cl.
 CPC ..... G05B 19/41855 (2013.01); G05B 19/042 (2013.01); G05B 19/4185 (2013.01); H04L 67/10 (2013.01); G05B 2219/31222 (2013.01); G05B 2219/42263 (2013.01); Y02P 90/18 (2015.11)

(58) Field of Classification Search
 CPC ............ G05B 19/41855; G05B 19/042; G05B 19/4185; G05B 2219/42263; G05B 2219/31222; H04L 67/10; Y02P 90/18
 See application file for complete search history.

(56) References Cited

U.S. PATENT DOCUMENTS

| | | | |
|---|---|---|---|
| 5,485,463 A | 1/1996 | Godoroja | |
| 7,647,131 B1* | 1/2010 | Sadowski | G05B 23/0297 700/108 |
| 8,347,015 B2* | 1/2013 | Derr | G06F 1/3203 710/305 |
| 9,442,758 B1* | 9/2016 | Sakarda | B60K 7/0007 |
| (Continued) | | | |

FOREIGN PATENT DOCUMENTS

JP    2003324644    * 11/2003    ............. H04N 5/225

OTHER PUBLICATIONS

Anonymous: "Client-Side Performance Tuning (Managing NFS and NIS, 2nd Edition)", pp. 1-6, Dec. 31, 2002.
(Continued)

Primary Examiner — Jing-Yih Shyu
(74) Attorney, Agent, or Firm — Fletcher Yoder PC (57) ABSTRACT

An industrial control system is provided that includes a first control set, having a first frame period. The first control set includes at least one first input/output (I/O) pack; and at least one first controller. The industrial control system also has a second control set with a second frame period. The second control set includes at least one second input/output (I/O) pack; and at least one second controller. A mixed-frame rate logic device is also included with the industrial control system. This device may handle sharing of input data, output data, or both provided by the first control set to the second control set when the first and second frame periods are different.

20 Claims, 4 Drawing Sheets (56) References Cited

U.S. PATENT DOCUMENTS

| | | | | |
|---|---|---|---|---|
| 2003/0016419 A1* | 1/2003 | Palmer | ................... | H04W 8/26 |
| | | | | 398/140 |
| 2006/0165026 A1 | 7/2006 | Apneseth et al. | | |
| 2008/0056124 A1* | 3/2008 | Nanda | ..................... | H04L 29/06 |
| | | | | 370/229 |
| 2008/0249641 A1* | 10/2008 | Enver | ................. | G05B 19/042 |
| | | | | 700/9 |
| 2008/0294275 A1* | 11/2008 | Reichard | ............. | G05B 19/042 |
| | | | | 700/88 |
| 2010/0235486 A1* | 9/2010 | White | ................ | H04L 43/0858 |
| | | | | 709/223 |
| 2012/0065748 A1* | 3/2012 | Nixon | ................... | G05B 21/02 |
| | | | | 700/73 |
| 2013/0173072 A1* | 7/2013 | Ridenour | ........... | H04L 12/6418 |
| | | | | 700/287 |
| 2013/0212420 A1* | 8/2013 | Lawson | ............ | G05B 19/4185 |
| | | | | 713/400 |
| 2014/0306892 A1* | 10/2014 | Lin | ......................... | G09G 5/22 |
| | | | | 345/159 |

OTHER PUBLICATIONS

European Search Report and Opinion issued in connection with corresponding EP Application No. 14197327 dated May 4, 2015.

* cited by examiner

SYSTEMS AND METHODS FOR PROVIDING MULTIPLE FRAME RATES ON A COMMON PHYSICAL NETWORK

BACKGROUND

The subject matter disclosed herein relates to an automation control system. Specifically, the current application relates to incorporating multiple controllers with different frame rates/periods on a common physical network.

Certain systems, such industrial control systems, may provide for control capabilities that enable the execution of control instructions in various types of devices, such as sensors, pumps, valves, and the like. As these systems become more sophisticated, the number of devices may increase substantially, resulting in increased supporting hardware, increased data, and increased network traffic across the system.

In certain control systems, multiple controllers can reside on a common physical network and consume data from each other's input/output modules (e.g., I/O packs). In many cases, controllers in an industrial control system may send and/or receive data at different frame rates/periods than other controllers in the network. Unfortunately, in traditional implementations, controllers that share input/output modules on a common physical network are not allowed to have different frame transmission and/or reception rates.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an industrial control system is provided that includes a first control set, having a first frame period. The first control set includes at least one first input/output (I/O) pack; and at least one first controller. The industrial control system also has a second control set with a second frame period. The second control set includes at least one second input/output (I/O) pack; and at least one second controller. A mixed-frame rate logic device (e.g., logic within the controller) is also included with the industrial control system. This device may handle sharing of input data, output data, or both provided by the first control set to the second control set when the first and second frame periods are different.

In a second embodiment, a tangible, non-transitory, machine-readable medium, includes machine-readable instructions to: transmit input data, output data, or both from a first control set configured with a first frame period; receive the input data, the output data, or both at a second control set configured with a second frame period, wherein the first and second frame periods are different; modify a timeout threshold to account for the different first and second frame periods; and modify processing of the input data, the output data, or both by the second control set to account for the different first and second frame periods.

In a third embodiment, an industrial control system includes at least one mixed-frame rate logic module. The mixed-frame rate logic modules sets a timeout threshold for receiving data based upon the slower of a first frame rate associated with a data-sending device and a second frame rate associated with a data-receiving device and provides data to the data-receiving device for subsequent processing at the slower of the first frame rate and the second frame rate.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Industrial control systems may include controllers and/or input/output modules (e.g., I/O packs) that send and/or receive data a certain rate (e.g., a certain frame rate/period). For example, these controllers and/or I/O packs may be configured with various frame periods (e.g., transmission/ reception of one frame every 10 ms, 20 ms, 40 ms, 80 ms, 160 ms, 320 ms, etc.). This may also be measured as a frame rate (e.g., 10 ms/frame, 20 ms/frame, 40 ms/frame, 80 ms/frame, 160 ms/frame, 320 ms/frame, etc.). Traditionally, control sets (e.g., a controller and its associated I/O packs) have utilized to stabilize communication of data within the control system. For example, in traditional systems, I/O packs were associated with a particular controller, where there was a common timing between the I/O packs and the associated controller. This created predictability between the I/O packs and the associated controller, enabling ease of communication between these components.

However, more recently, there has been a move towards sharing among separate control sets. For example, in more modern approaches, I/O ports of a first I/O pack in a first control set may be utilized by a controller in a second control set. This may be useful, for example, to allow free ports of the first control set to be used by the second control set when there are no available ports in the second control set. Accordingly, hardware costs may be reduced by utilizing free ports of alternative control rather than purchasing additional hardware for the first control set. Unfortunately, the frame rates/periods may differ among control sets, causing data inputs and/or outputs to be received and/or sent at mismatched times.

The embodiments discussed below provide mixed-frame rate logic for an industrial control system that enables control sets to communicate with one another at a matched frame rate/period. Accordingly, data may be shared among the control sets using a uniform timing, regardless of whether or not the control sets have a uniform transmission/reception frame rate/period. This may provide new efficiencies for the industrial control system.

Figure 1:
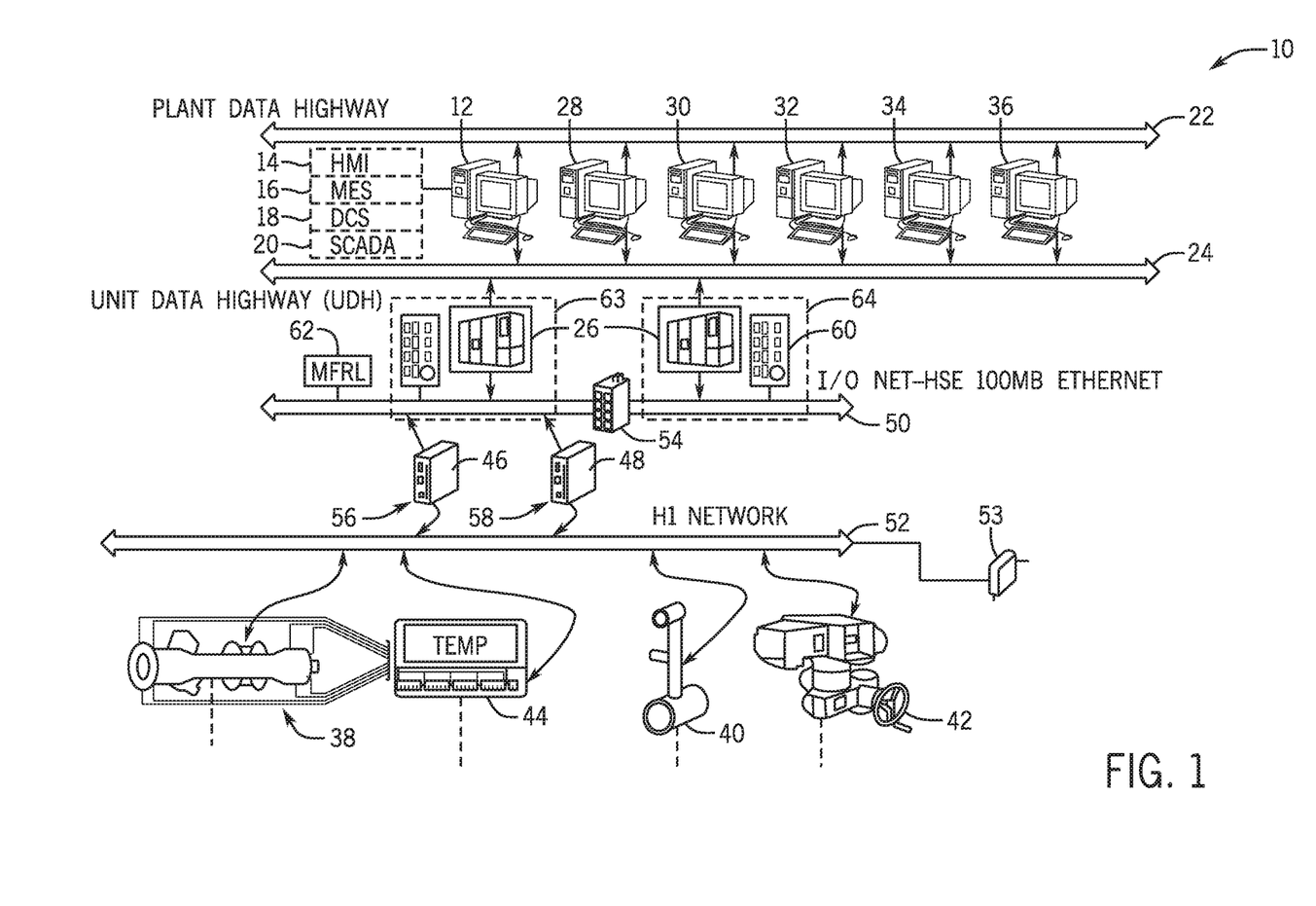
FIG. 1 is a schematic diagram of an embodiment of an automation control system (e.g., an industrial control system), including a multi-frame rate logic module to handle sharing of data across multi-frame rate control sets, in accordance with an embodiment.

Turning to FIG. 1, an embodiment of an industrial process control system 10 is depicted. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Company, of Schenectady, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, and a computer 36 hosting an alarm viewer. Other computers coupled to the plant data highway 22 and/or the unit data highway 24 may include computers hosting Cimplicity™, ControlST™, and ToolboxST™, available from General Electric Co., of Schenectady, N.Y.

The system 10 may include any number and suitable configuration of industrial controllers 26. For example, in some embodiments the system 10 may include one industrial controller 26, two industrial controllers 26, three, or more industrial controllers for redundancy. The industrial controllers 26 may enable control logic useful in automating a variety of plant equipment, such as a turbine system 38, a valve 40, and a pump 42. Indeed, the industrial controllers 26 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), and so forth.

In the depicted embodiment, the turbine system 38, the valve 40, the pump 42, and the temperature sensor 44 are communicatively interlinked to the industrial controller 26 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as one of the industrial controllers 26, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/0 Net 50 and the H1network 52.

A variety of devices may be linked to the industrial controller 26 and to the computer 12. For example, the devices, such as the turbine system 38, the valve 40, the pump 42, and the temperature sensor 44, may include industrial devices, such as Foundation Fieldbus devices that include support for the Foundation H1 bi-directional communications protocol. In such an embodiment, a Foundation Fieldbus power supply 53, such as a Phoenix Contact Fieldbus Power Supply available from Phoenix Contact of Middletown, Pa., may also be coupled to the H1 network 52 and may be coupled to a power source, such as AC or DC power. The power supply 53 may be suitable for providing power to the devices 38, 40, 42, and 44, as well as for enabling communications between the devices 38, 40, 42, and 44. Advantageously, the H1 network 52 may carry both power and communications signals (e.g., alert signals) over the same wiring, with minimal communicative interference. The devices 38, 40, 42, and 44 may also include support for other communication protocols, such as those included in the HART® Communications Foundation (HCF) protocol, and the Profibus Nutzer Organization e.V. (PNO) protocol.

Each of the linking devices 46 and 48 may include one or more segment ports 56 and 58 useful in segmenting the H1 network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58 may enable a physical separation useful in maintaining fault tolerance, redundancy, and improving communications time. In some embodiments, additional devices may be coupled to the I/O NET 50. For example, in one embodiment an I/O pack 60 may be coupled to the I/O NET 50. The I/O pack 60 may provide for the attachment of additional sensors and actuators to the system 10.

As illustrated, multiple controllers 26 may reside on the same physical network. I/O packs 60 (e.g., input/output modules) are associated with a particular controller 26, forming a control set (e.g., control set 63 and control set 64). However, as discussed above, in certain situations, it may be useful for one control set (e.g., control set 63) to consume and/or transmit data to a separate control set (e.g., control set 64). For example, as will be discussed in more detail below, one or more of the controllers 26 of the system 10 (e.g., controller 26 in control set 63) may consume and/or send data to an I/O pack 60 of a separate control set (e.g., I/O pack 60 in control set 64). However, because the control sets (e.g., a controller 26 and its associated I/O packs 60) are configured to receive data a particular frame rate, a uniform frame rate/period may be used in cross-transmission and/or cross-consumption to/from an I/O pack 60 of another controller 26.

Accordingly, the system 10 may include a mixed-frame rate logic 62 module (e.g., machine-implemented instructions, stored on a non-transitory, machine-readable medium) that, when implemented by a processor, may stabilize frame rates/periods among control sets with differing frame rates/periods (e.g., control set 64). For example, the logic 62 may modify data communication timeout settings and data intake settings. As illustrated in FIG. 1, the mixed-frame rate logic 62 may be implemented on the I/O NET 50. For example, the mixed-frame rate logic 62 may be implemented on a processing device such as one or more of the controllers 26 attached to the I/O NET 50.

Figure 2:
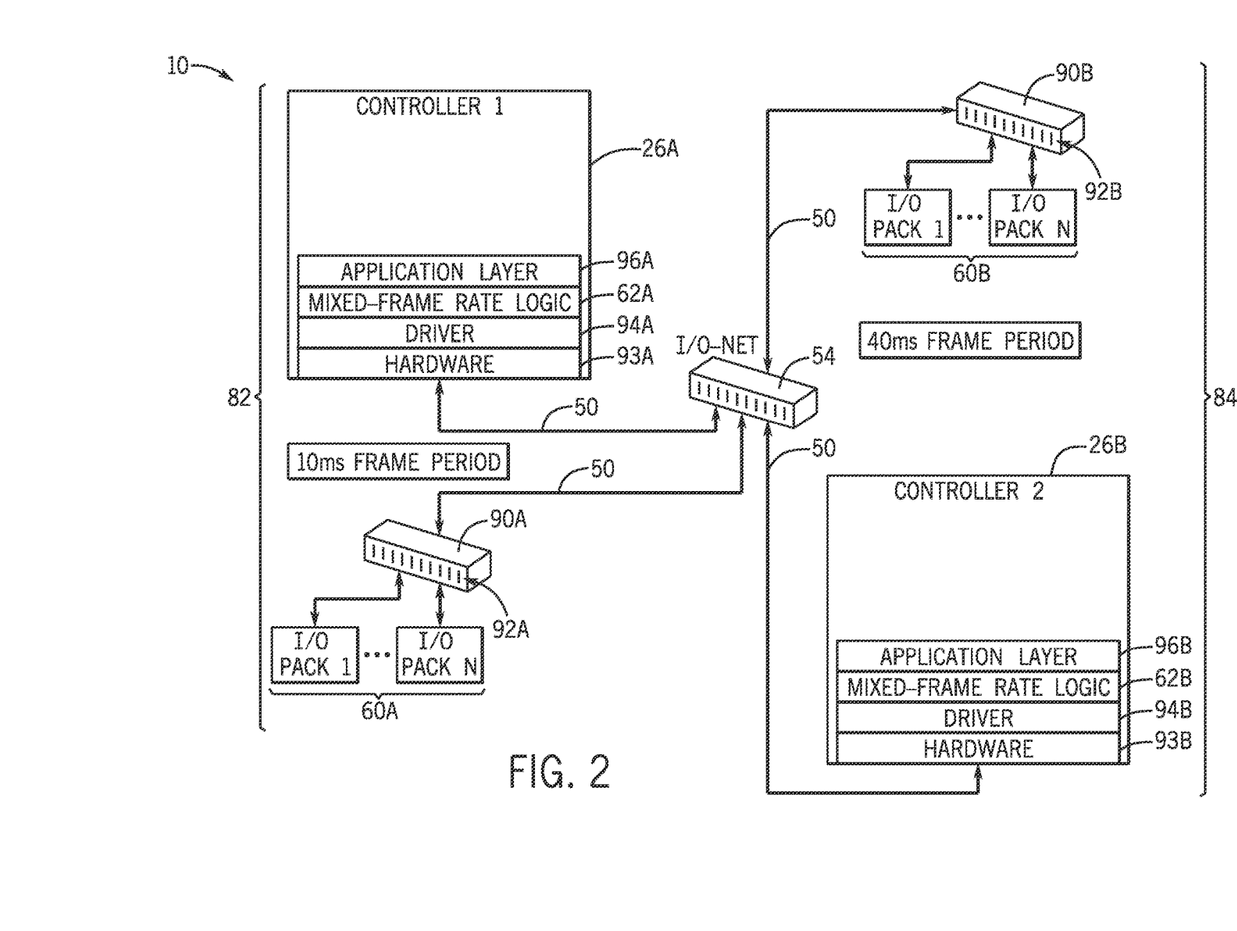
FIG. 2 is a block diagram illustrating input/output module sharing among controllers with different frame rates/periods, in accordance with an embodiment.
Figure 5:
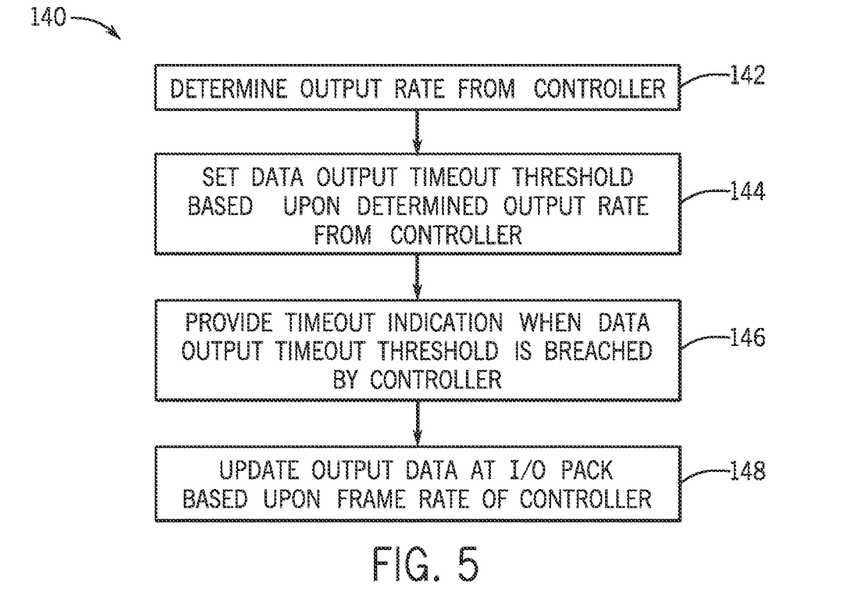
FIG. 5 is a flowchart illustrating a process for implementing multi-rate controller outputs when the expected frame rate of the I/O pack is faster than the frame rate of the controller sending the output data, in accordance with an embodiment.

Having discussed the industrial control system 10 having the mixed-frame rate logic 62, FIG. 2 is a block diagram illustrating input/output module (e.g., I/O pack 60) sharing among control sets with different frame rates/periods, in accordance with an embodiment. In the example provided in FIG. 2, there are two control sets, namely control set 82 and control set 84. For clarity, reference numerals with an "A" represent portions of control set 82, while reference numerals with a "B" represent portions of control set 84. As illustrated, the control set 82 includes a controller 26A, a switch 90A with one or more ports 92A, and one or more I/O packs 60A. The controller 26A may include communications hardware 93A, a driver 94A (e.g., machine-executable instructions for interpreting data) for the communications hardware 93A, mixed-frame rate logic 62A, and an application layer 96A. The communications hardware 93A may receive packets from the I/O NET 50, the driver 94A may provide instructions to the controller 26A for interpreting data received by the hardware 93A, and the application layer 96A may make use of the interpreted data. When communicating within the control set 82, the switches 90A of the control set 82 may direct data to/from the proper controller 26A of the particular control set 82 via the I/O NET 50 and switch 54. As depicted in FIG. 5, control set 82 may have a frame period of 10 ms.

Additionally, control set 84 may also include a controller 26B, a switch 90B with one or more ports 92B, and one or more I/O packs 60B. The communications hardware 93B may receive packets from the I/O NET 50, the driver 94B may provide instructions to the controller 26B for interpreting data received by the hardware 93B, and the application layer 96B may make use of the interpreted data. Similar to the control set 82, when communicating within the control set, the switches 90B of the control set 84 may direct data to/from the proper controller 26B of control set 84 via the I/O NET 50 and switch 54. As depicted, in the current example, control set 84 may have a frame period of 40 ms.

As mentioned above, it may be desirable to share an I/O pack 60 of one control set with another control set. For example, there may be a limited number of ports 92A (e.g., 10 ports) on the switch 90A. If 10 I/O packs 60A are already coupled to the 10 ports 92A of switch 90A, no additional I/O packs 60A may be added to the control set 82. Accordingly, if there are no free ports 92B on the switch 90B of control set 84, it may be desirable to couple a new I/O pack 60B to switch 90B and share the new I/O pack 60B's data with control set 82 (e.g., share it with controller 26A of control set 82).

However, as mentioned above, the control sets 82 and 84 are configured to send data at particular rates. Because control set 82 is configured with a 10 ms frame period and control set 84 is configured with a 40 ms frame period, control set 82 sends and receives data 4 times faster than control set 84. Accordingly, to share data from an I/O pack 60B with controller 26A of control set 82, the control sets 82 and 84 may discern and handle any challenges associated with the different frame periods. As discussed above, the mixed-frame rate logic 62 (e.g., 62A and/or 62B) may provide this mixed-frame rate/period handling. Though the current example illustrates the mixed-frame rate logic 62 integrated in one or more controllers 26 (e.g., controllers 26A and/or 26B), the mixed-frame rate logic 62 may be implemented on any processing device attached to the I/O NET 50.

Two example cases that the mixed-frame rate logic 62 may handle, regarding mixed-frame rates among control sets, include: a) frames of data that are received by a controller 26 more often than the frame period of the receiving controller 26 and b) frames of data that are received by a controller 26 less often than the frame period of the receiving controller 26.

In the first case, when frames of data are received/sent more rapidly than the frame period of a receiving controller, the hardware of the control set may be overloaded. For instance, if the control sets 82 and/or 84 are configured to share data of an I/O pack 60A with controller 26B, the data from the I/O pack 60A may be sent 4 times as fast as controller 26B receives data, because control set 82 has a 10 ms frame period, while control set 84 has a 40 ms frame period. Because the data is sent 4 times as fast as it is received, the application layer 96B may be bombarded with unutilized data. Accordingly, as will be discussed in more detail below, the mixed-frame rate logic 62 may counter-act this bombardment.

In the second case, when frames of data are received/sent less rapidly than the frame period of a receiving controller, the hardware of the control set may erroneously discern that the system 10 is unhealthy (e.g., erroneously indicate that data from the I/O packs 60 have timed out). For instance, if the control sets 82 and/or 84 are configured to share date of an I/O pack 60B with controller 26A, the data from the I/O pack 60B may be sent 4 times slower than controller 26A receives data, because control set 82 has a 10 ms frame period, while control set 84 has a 40 ms frame period. Because the data is sent 4 times slower than it is received, the controller 26A may erroneously indicate that data transmission has timed out, because data is not received in each 10 ms period. Accordingly, as will be discussed in more detail below, the mixed-frame rate logic 62 may counter-act this erroneous timeout indication.

Figure 3:
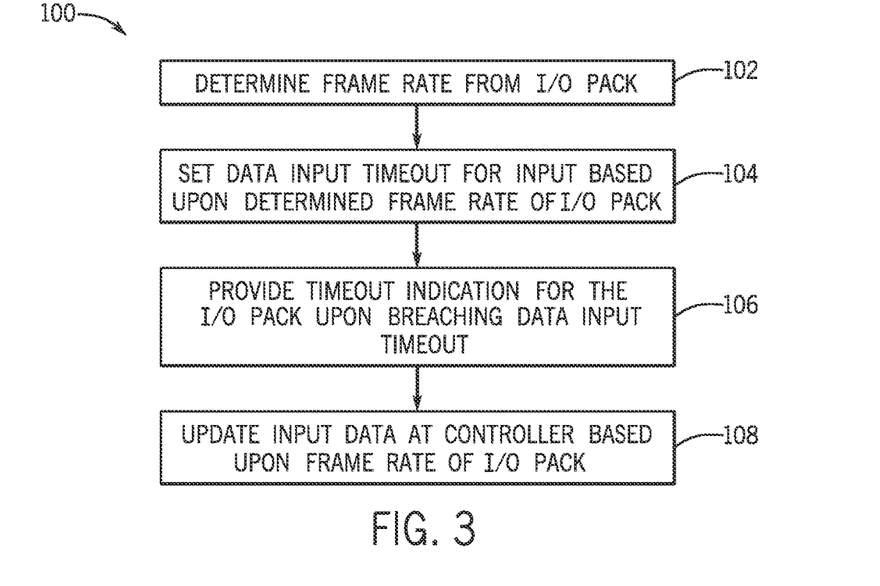
FIG. 3 is a flowchart illustrating a process for implementing multi-rate controller inputs when the expected frame rate of the controller is faster than the frame rate of the I/O pack, in accordance with an embodiment.
Figure 4:
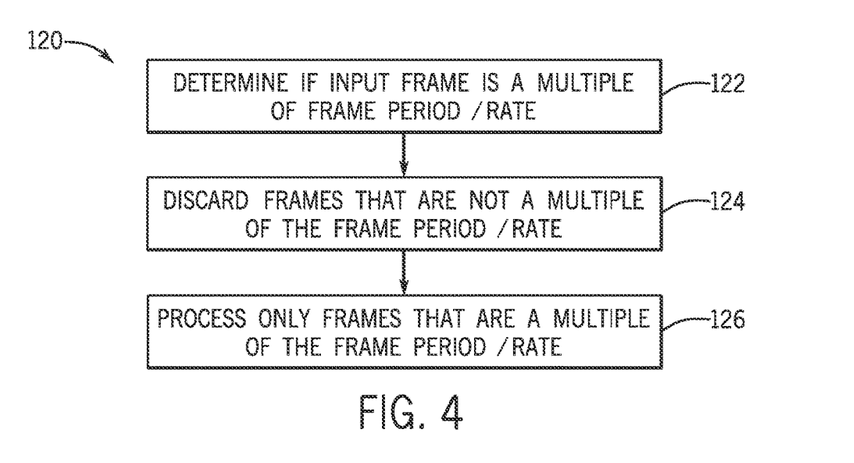
FIG. 4 is a flowchart illustrating a process for implementing multi-rate controller inputs when the expected frame rate of the controller is slower than the frame rate of the I/O pack, in accordance with an embodiment.

FIGS. 3 and 4 illustrate computer-implemented processes that the mixed-frame rate logic 62 may follow to handle cases where input data is sent by the I/O packs 60 at a different rate than it is received by the controller 26. FIG. 3 is a flowchart illustrating a computer-implemented process 100 for handling the transmission and/or reception of I/O pack input data when the frame rate of the controller 26 receiving the data is faster than the frame rate of the I/O pack 60 sending the data (e.g., the case discussed in FIG. 2, where control set 84 shares I/O pack 60B data with control set 82).

First, the frame rate/period of the I/O pack 60 sending the input data is determined (block 102). The frame rate/period of the I/O pack 60 may be determined, for example, by accessing configuration files of a configuration program for the industrial control system 10 (e.g., ToolboxST™, available from General Electric Co., of Schenectady, N.Y.) or through a periodic packet analysis of transmissions sent from the I/O pack 60.

Next, in contrast to systems where the timeout threshold (e.g., the amount of time before a timeout indication is triggered) may be based upon the receiving control set's frame period, the timeout threshold is set based upon the sending I/O pack's frame period (block 104). For instance, in the example provided in FIG. 2, the sending I/O pack 60B's frame period is 40 ms. Accordingly, the controller 26A that receives the input data from I/O pack 60B may be configured to timeout when data is not provided by the I/O pack 60B within a 40 ms period. Thus, the controller 26A will provide a timeout indication for the sending I/O pack 60 (e.g., I/O pack 60B) upon breaching the set timeout threshold (e.g., 40 ms) (block 106).

Further, the controller 26 may be configured to update (e.g., take in) input data at the frame rate of the I/O pack 60 (block 108). For example, the controller 26A may be configured to receive data from I/O packs 60B based upon the I/O packs' frame period/rate, thus overriding the controller 26A's frame period/rate.

By implementing the process 100, when the mixed-frame rate logic 62 determines that the sending rate is slower than the receiving rate, several multi-frame rate obstacles are overcome. Erroneous timeout indications are avoided. Further, valid data is received at the controller despite being transmitted to the controller 26 at a rate slower than expected by the controller 26.

FIG. 4 is a flowchart illustrating a computer-implemented process 120 for handling the transmission and/or reception of I/O pack input data when the frame rate of the controller 26 receiving the data is slower than the frame rate of the I/O pack 60 sending the data (e.g., the case discussed in FIG. 2, where control set 82 shares I/O pack 60A data with control set 84).

When the mixed-frame rate logic 62 determines that the receiving rate is slower than the sending rate, the logic 62 determines if a frame number is a multiple of the receiving frame period/rate (block 122). The frame number may be a reference number of a frame of data sent that is based upon a synchronized time across the industrial control system 10. The synchronized time may be defined according to the IEEE 1588 precision time protocol (PTP). In the example discussed regarding FIG. 2 where the input data is sent from I/O packs 60A at 10 ms, the frame numbers may be, for example, 0, 10, 20, 30, 40, etc. (indicating a new frame of data every 10 ms). Because the controller 26B is configured to receive frames every 40 ms, the controller 26B expects to receive frames 0, 40, 80, 120, 160, etc. (e.g., each frame number that is associated with (e.g., is a multiple of) the 40 ms period).

Each of the transmitted frames of data that are not a multiple of the receiving frame period is discarded (block 124). In certain embodiments, the application layer 96 (e.g., 96A and/or 96B) may discard the non-multiple frames. However, this may lead to processing inefficiencies, as the application layer 96 may need to exert processing power (e.g., processing power of the controllers 26) to discard these frames. Accordingly, in certain embodiments, a filter may be implemented to discard the non-multiple frames prior to the frames reaching the application layer 96. For example, in certain embodiments, a fast user datagram protocol (UDP) filter may be used to filter out any non-multiple frames prior to the frame reaching the application layer 96. Accordingly, the processing burden of the application layers 96 may be reduced, because the application layers 96 may receive fewer frames of data. In the current example, referring back to FIG. 2, the I/O packs 60A send frames 0, 10, 20, 30, 40, 50, etc. However, frames 10, 20, 30, 50, etc. will be discarded, because they are not multiples of the receiving frame period/rate of 40 ms.

Each frame of data that is a multiple of the receiving frame rate may be processed by the application layer 96 (block 126). Accordingly, in the current example, referring back to FIG. 2, each frame sent by the I/O packs 60A that is a multiple of 40 may be processed (e.g., frames 0, 40, 80, 120, etc.). These frames are provided to the application layer 96, where the controller-based processing may occur.

Figure 6:
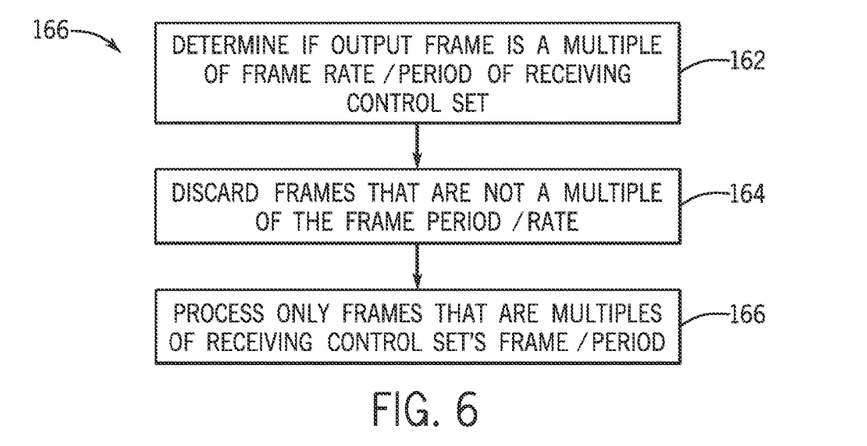
FIG. 6 is a flowchart illustrating a process for implementing multi-rate controller outputs when the expected frame rate of the I/O pack is slower than the frame rate of the controller sending the output data, in accordance with an embodiment.

Having now discussed cases regarding input data from the I/O packs 60, the discussion turns to cases regarding output data sent from the controllers 26 to the I/O packs 60. As mentioned above, the controllers 26 may provide output data to the I/O packs 60 which is then propagated to devices attached to the I/O packs 60. The same mixed-frame rate issues may arise when transmitting this output data from the controllers 26 to the I/O packs 60. For example, the output data may be sent by the controller 26 to an I/O pack 60 at a different rate than the I/O pack 60 receives data (e.g., more rapidly or more slowly). Accordingly, the mixed-frame rate logic 62 may counteract effects of this mismatched rate. Once again, the mixed-frame rate logic 62 may reside on any processing device of the I/O NET 50. In certain embodiments, the logic 62 may reside on the transmitting controller 26, the receiving switch 90, and/or the receiving I/O pack 60. FIGS. 5 and 6 illustrate a process that the mixed-frame rate logic 62 may follow.

FIG. 5 is a flowchart illustrating a computer-implemented process 140 for handling multi-frame rates when the frame rate of the I/O pack 60 is faster than the receiving frame rate of the controller 26 sending the controller output data.

First, the frame rate/period of the controller 26 sending the output data is determined (block 142). The frame rate/period of the controller 26 may be determined, for example, by accessing configuration files of a configuration program for the industrial control system 10 (e.g., ToolboxST™, available from General Electric Co., of Schenectady, N.Y.) or through a periodic packet analysis of transmissions sent from the controller 26.

Next, in contrast to traditional systems where the timeout threshold (e.g., the amount of time before a timeout indication is triggered) may be based upon the receiving control set's frame period, the timeout threshold (or expected output rate) is set based upon the output rate from the controller 26 (e.g., which may be the sending I/O pack's frame period) (block 144). For instance, in the example provided in FIG. 2, the sending controller 26B's frame period is 40 ms. Accordingly, the I/0 pack 60A that receives the output data from controller 26B may be configured to timeout when data is not provided by the controller 26B within a 40 ms period. Thus, the I/O pack 60A may provide a timeout indication for the sending controller 26 (e.g., controller 26B) upon breaching the set timeout threshold (e.g., 40 ms) (block 146).

Further, the I/O pack 60 may be configured to update (e.g., take in) controller output data at the frame rate of the controller 26 (block 148). For example, the I/O pack 60A may be configured to receive data from controller 26B based upon the controller 26B's frame period/rate, thus overriding the I/O pack 60A's frame period/rate.

By implementing the process 140, when the mixed-frame rate logic 62 determines that the sending rate of controller output data is slower than the receiving rate, several multi-frame rate obstacles are overcome. Erroneous timeout indications are avoided. Further, valid data is received at the I/O packs 60 despite being transmitted to the I/O packs 60 at a rate slower than expected.

FIG. 6 is a flowchart illustrating a computer-implemented process 160 for handling the transmission and/or reception of controller output data when the frame rate of the I/O pack 60 receiving the data is slower than the frame rate of the controller 26 sending the data (e.g., the case where control set 82 shares controller 26A data with control set 84).

When the mixed-frame rate logic 62 determines that the receiving rate is slower than the sending rate, the logic 62 determines if a frame number is a multiple of the receiving frame period/rate (block 162). The frame number may be a reference number of a frame of data sent that is based upon a synchronized time across the industrial control system 10. Referring to FIG. 2, for example, where the controller output data is sent from controller 26A at 10 ms, the frame numbers may be, for example, 0, 10, 20, 30, 40, etc. (indicating a new frame of data every 10 ms). Because the I/O pack 60B is configured to receive frames every 40 ms, the I/O pack 60B may receive frames 0, 40, 80, 120, 160, etc. (e.g., each frame number that is associated with (e.g., is a multiple of) the 40 ms period).

Each of the transmitted frames of data that are not a multiple of the receiving frame period is discarded (block 164). In certain embodiments, the application layer 96 (e.g., 96A and/or 96B) may discard the non-multiple frames. However, this may lead to processing inefficiencies, as the application layer 96 may need to exert processing power of the controllers 26, switches 54 or 90, and/or the I/O packs 60 to discard these frames. Accordingly, in certain embodiments, a filter may be implemented to discard the non-multiple frames. For example, in certain embodiments, a fast user datagram protocol (UDP) filter may be used to filter out any non-multiple frames prior to the frame reaching the application layer 96. Accordingly, the processing burden of the application layers 96 may be reduced, because the application layers 96 may receive fewer frames of data. In the current example, referring back to FIG. 2, the controller 26A sends frames 0, 10, 20, 30, 40, 50, etc. However, frames 10, 20, 30, 50, etc. will be discarded, because they are not multiples of the receiving frame period/rate of 40 ms.

Each frame of data that is a multiple of the receiving frame rate may be processed by the application layer 96 (block 166). Accordingly, in the current example, referring back to FIG. 2, each frame sent by the controller 26A that is a multiple of 40 may processed (e.g., frames 0, 40, 80, 120, etc.). These frames are provided to the application layer 96, where the controller-based processing may occur.

Technical effects of the invention include adjustment of frame rates/periods of controllers and/or I/O packs on common physical networks. Specifically, data frame rates/periods may be adjusted by mixed frame rate logic that adjusts a timeout setting for expected data and/or discards excessive data. Accordingly, the mixed frame logic may result in an enhanced industrial control system. For example, multiple controllers and/or I/O packs having differing frame rates may share data on the same physical network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial control system, comprising:
    a first control set configured with a first frame period, wherein the first control set comprises:
        at least one first input/output (I/O) pack; and
        at least one first controller;
    a second control set configured with a second frame period, wherein the second control set comprises:
        at least one second input/output (I/O) pack; and
        at least one second controller; and
    a mixed-frame rate logic device configured to handle sharing of input data, output data, or both provided by the first control set to the second control set when the first and second frame periods are different.

2. The system of claim 1, wherein the mixed-frame rate logic device is configured to handle sharing of input data, output data, or both when the first frame period is slower than the second frame period, by:
    setting a timeout threshold for receiving the input data, output data, or both based upon the first frame period; and
    providing a timeout indication only when the input data is not received within a time period defined by the timeout threshold.

3. The system of claim 1, wherein the mixed-frame rate logic device is configured to handle sharing of input data, output data, or both when the first frame period is slower than the second frame period, by:
    providing the input data, output data, or both to the second control set for subsequent processing based upon the first frame period.

4. The system of claim 1, wherein the mixed-frame rate logic device is configured to handle sharing of input data, output data, or both when the first frame period is faster than the second frame period, by:
    determining if a frame number of the input data, output data, or both is a multiple of the second frame period; and
    discarding any frames that have an associated frame number that is not a multiple of the second frame period.

5. The system of claim 4, wherein the frames that have the associated frame number that is not the multiple of the second frame period are discarded prior to reaching an application layer of the second control set.

6. The system of claim 4, wherein the frames that have the associated frame number that is not the multiple of the second frame period are discarded using a fast user datagram protocol (UDP) filter.

7. The system of claim 4, wherein the mixed-frame rate logic device is configured to handle sharing of input data, output data, or both when the first frame period is faster than the second frame period, by:
providing the input data, output data, or both with the associated frame number that is the multiple of the second frame period to the second control set for subsequent processing.

8. The system of claim 4, wherein the frame number is based upon a synchronization time of the industrial control system.

9. The system of claim 8, wherein the synchronization time is defined based upon the IEEE 1588 precision time protocol.

10. The system of claim 1, wherein the first controller, the second controller, or both comprise the mixed-frame rate logic device.

11. The system of claim 1, wherein the first I/O pack, the second I/O pack, or both comprise the mixed-frame rate logic device.

12. The system of claim 1, comprising at least one switch having the mixed-frame rate logic device.

13. A tangible, non-transitory, machine-readable medium, comprising machine-readable instructions to:
transmit input data, output data, or both from a first control set configured with a first frame period;
receive the input data, the output data, or both at a second control set configured with a second frame period, wherein the first and second frame periods are different;
modify a timeout threshold to account for the different first and second frame periods; and
modify processing of the input data, the output data, or both by the second control set to account for the different first and second frame periods.

14. The machine-readable medium of claim 13, comprising machine-readable instructions to modify the timeout threshold by:
setting the timeout threshold based upon the slower of the first frame period and the second frame period, wherein the timeout threshold indicates a threshold time period under which input data, output data, or both should be received.

15. The machine-readable medium of claim 13, comprising machine-readable instructions to modify processing of the input data, the output data, or both by:
providing the input data, the output data, or both to processing components of the second control set, based upon the slower of the first frame period and the second frame period.

16. The machine-readable medium of claim 13, comprising machine-readable instructions to modify processing of the input data, the output data, or both by:
providing the input data, the output data, or both to an application layer of the second control set, based upon the slower of the first frame period and the second frame period.

17. The machine-readable medium of claim 13, comprising machine-readable instructions to determine the first frame period, the second frame period, or both by interpreting one or more configuration files of one or more configuration systems of an industrial control system.

18. The machine-readable medium of claim 13, comprising machine-readable instructions to determine the first frame period, the second frame period, or both by monitoring a data transfer rate of the first control set, the second control set, or both.

19. A method, comprising:
transmitting input data, output data, or both from a first control set configured with a first frame period;
receiving the input data, the output data, or both at a second control set configured with a second frame period, wherein the first and second frame periods are different;
modifying a timeout threshold to account for the different first and second frame periods; and
modifying processing of the input data, the output data, or both by the second control set to account for the different first and second frame periods.

20. The method of claim 19, comprising:
modifying the timeout threshold by:
setting the timeout threshold based upon the slower of the first frame period and the second frame period, wherein the timeout threshold indicates a threshold time period under which input data, output data, or both should be received;
modifying processing of the input data, the output data, or both by:
providing the input data, the output data, or both to processing components of the second control set, based upon the slower of the first frame period and the second frame period; or
providing the input data, the output data, or both to an application layer of the second control set, based upon the slower of the first frame period and the second frame period;
determining the first frame period, the second frame period, or both by:
interpreting one or more configuration files of one or more configuration systems of an industrial control system; or
monitoring a data transfer rate of the first control set, the second control set, or both;
or any combination thereof.

* * * * *